US010466709B2

(12) United States Patent
Kurata et al.

(10) Patent No.: US 10,466,709 B2
(45) Date of Patent: Nov. 5, 2019

(54) AUTONOMOUS DRIVING VEHICLE AND AUTONOMOUS DRIVING SYSTEM

(71) Applicant: Hitachi, Ltd., Chiyoda-ku, Tokyo (JP)

(72) Inventors: Kenichirou Kurata, Tokyo (JP); Hiroto Morizane, Tokyo (JP); Shigeru Matsuo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 247 days.

(21) Appl. No.: 15/032,972

(22) PCT Filed: Nov. 8, 2013

(86) PCT No.: PCT/JP2013/080178
§ 371 (c)(1),
(2) Date: Apr. 28, 2016

(87) PCT Pub. No.: WO2015/068249
PCT Pub. Date: May 14, 2015

(65) Prior Publication Data
US 2016/0282874 A1  Sep. 29, 2016

(51) Int. Cl.
G05D 1/00 (2006.01)
G05D 1/02 (2006.01)

(52) U.S. Cl.
CPC ........ G05D 1/0223 (2013.01); G05D 1/0088 (2013.01); G05D 1/0274 (2013.01); G05D 1/0289 (2013.01); G05D 1/024 (2013.01); G05D 1/0251 (2013.01); G05D 1/0257 (2013.01); G05D 1/0278 (2013.01); G05D 2201/021 (2013.01)

(58) Field of Classification Search
None
See application file for complete search history.

(56) References Cited

U.S. PATENT DOCUMENTS

| 6,226,572 | B1 | 5/2001 | Tojima et al. |
| 7,046,822 | B1 | 5/2006 | Knoeppel et al. |
| 9,146,559 | B2* | 9/2015 | Kuss ........................ B66F 9/063 |
| 9,352,779 | B2* | 5/2016 | Kindo .................. G05D 1/0088 |
| 9,927,813 | B1* | 3/2018 | Ferguson ............... G05D 1/024 |

(Continued)

FOREIGN PATENT DOCUMENTS

| JP | 10-222227 A | 8/1998 |
| JP | 2003-502745 A | 1/2003 |

(Continued)

OTHER PUBLICATIONS

International Search Report (PCT/ISA/210) issued in PCT Application No. PCT/JP2013/080178 dated Feb. 4, 2014 with English-language translation (two (2) pages).

Primary Examiner — James M McPherson
(74) Attorney, Agent, or Firm — Crowell & Moring LLP

(57) ABSTRACT

An autonomous driving vehicle includes map information storage means, sensor state evaluation means, movement obstacle evaluation means, and speed limit value setting means. When the result of the evaluation of the sensor state evaluation means is within a first range, and a result of the evaluation of the movement obstacle evaluation means is without a second range, then a speed limit value is set based on the result of the evaluation of the sensor state evaluation means and then driving is continued within a range of the limit value.

6 Claims, 11 Drawing Sheets

(56) References Cited

U.S. PATENT DOCUMENTS

| | | | |
|---|---|---|---|
| 2012/0170808 A1 | 7/2012 | Ogata et al. | |
| 2013/0253792 A1* | 9/2013 | Hammoud | B60T 7/22 |
| | | | 701/70 |
| 2014/0156133 A1* | 6/2014 | Cullinane | B60W 30/00 |
| | | | 701/23 |
| 2018/0043904 A1* | 2/2018 | Cullinane | G05D 1/0061 |

FOREIGN PATENT DOCUMENTS

| | | |
|---|---|---|
| JP | 2007-323675 A | 12/2007 |
| JP | 2010-176283 A | 8/2010 |
| JP | 2010-256138 A | 11/2010 |
| JP | 2011-69626 A | 4/2011 |
| JP | 2011-145166 A | 7/2011 |
| JP | 2012-122816 A | 6/2012 |
| JP | 2012-257107 A | 12/2012 |

* cited by examiner

FIG. 11

MOTION DETERMINATION RULE WHEN THE SENSOR PERFORMANCE DEGRADES

| | SENSOR TYPE 1101 | EVALUATION VALUE RANGE 1102 | MOTION MODE 1103 | SPEED LIMIT 1104 | STEERING ANGLE LIMIT 1105 | CLEANING MOTION 1106 | CENTER NOTIFICATION 1107 |
|---|---|---|---|---|---|---|---|
| ITEM | | | | | | | |
| 1 (1108) | STEREO CAMERA | 0-20 | NORMAL OPERATION | N/A | N/A | 0 | 0 |
| | | 20-40 | CLEANING | N/A | N/A | 1 | 0 |
| | | 40-100 | DEGENERATION OPERATION | ×0.6 | N/A | 0 | 1 |
| | | 100- | DEGENERATION OPERATION | ×0.3 | 30 DEGREES | 0 | 1 |
| 2 (1109) | LIDER | 0-35 | NORMAL OPERATION | N/A | N/A | 0 | 0 |
| | | 35-50 | DEGENERATION OPERATION | ×0.5 | N/A | 1 | 1 |
| | | 50- | DEGENERATION OPERATION | N/A | N/A | 0 | 0 |
| 3 (1110) | MILLIMETER WAVE RADARS | 0-45 | NORMAL OPERATION | N/A | N/A | 0 | 0 |
| | | 45- | DEGENERATION OPERATION | ×0.7 | 20 DEGREES | 0 | 1 |
| 1+2+3 (1111) | SUM | 0-200 | NOT SPECIFIED | N/A | N/A | 0 | 0 |
| | | 200- | OPERATION STOPPING | 0 km/h | 0 DEGREES | 0 | 1 |
| 1+2+3 (1112) | MAXIMUM VALUE REACHING EXPECTED VALUE OF ITEMS 1 TO 3 | 0-40 | NORMAL OPERATION | N/A | N/A | 0 | 0 |
| | | 40- | REQUEST MAINTANANCE | N/A | N/A | 0 | 1 |
| 4 (1113) | GPS | -10 | OPERATION STOPPING MODE CRAWLING PERMISSION | 5 km/h | 15 DEGREES | 0 | 1 |

AUTONOMOUS DRIVING VEHICLE AND AUTONOMOUS DRIVING SYSTEM

TECHNICAL FIELD

The present invention relates to an autonomous driving vehicle which autonomously drives on a driving path and an autonomous driving system which controls a plurality of autonomous driving vehicles by occlusion control.

BACKGROUND ART

In a mining work in a mine, a technology for performing a mining work by an unmanned machine in order to implement enhancement of the safety and reduction of the cost is demanded. In the mining site, it is necessary to dig the earth and sand and transport minerals and the earth and sand to the outside of the mining site. Although a work for transporting the earth and sand to the outside of the mining site is performed by a huge vehicle having a great earth and sand load amount such as a dump truck, since the transportation amount of the earth and sand per unit time is directly connected to the progress of mining, high speed, accurate and continuous transportation is demanded.

In an autonomous driving system in a mining dump, a route is determined on the basis of own vehicle position information by a position measurement apparatus such as a GPS apparatus mounted on a mining dump and map data of the mine, and autonomous driving control is performed such that an accident may not occur while the shape and the position of a running road surface and an obstacle are detected by external world recognition sensors attached to the vehicle.

A transport path on which a mining dump drives is as long as several km to ten and several km in a wide mining site or the like and is frequently maintained in an extent of approximately two lanes for back and forth passages in order to prevent increase of the maintenance cost for the transport path. Therefore, when a vehicle is stopped midway of a transport path from a reason such as a failure, a method wherein also a succeeding vehicle is disabled to operate and stops or a method wherein a succeeding vehicle is permitted to take over with the speed thereof limited in order to prevent a risk of collision with an oncoming vehicle is available.

Further, since a mine dump has a very great size and weight and it is difficult to perform sudden braking or steering, it is possible to achieve further enhancement of the safety by adopting occlusion control to perform control. In particular, if a virtual occlusion section is set to a transport path and occlusion control for permitting driving of only one vehicle in the set section is performed, then an accident such as rear-end collision can be prevented even if unexpected stopping or the like occurs.

On the other hand, if attention is paid to the vehicle side, dust, mad splash and so forth occur frequently on a transport path on which the vehicle drives in comparison with a common road, and a vehicle drives in a severe environment. Therefore, it is considered that the possibility that a detection performance for an obstacle and so forth is degraded by dirt or a failure of an external world recognition sensor increases, and a countermeasure against this is a significant subject.

As a background technology of the present technical field, Patent Document 1 is available.

In the prior art, a method is disclosed in which, when part of a transport path disables driving thereon because of a failed vehicle or an obstacle, only the speed limit within some section which includes a location at which driving is disabled is changed to prevent collision with an oncoming vehicle upon overtaking is prevented. Consequently, even in the case where such a failure occurs that the vehicle is stopped due to a failure of a sensor or the like, other vehicles can safely overtake the stopping vehicle and continue movement, and such a situation that even normal vehicles are stopped can be prevented thereby to raise the overall movement efficiency.

Meanwhile, Patent Document 2 describes that a state of a failure of a plurality of sensors for autonomous driving is detected and, when it can be confirmed that, in an abnormal case, the other sensors are normal, the vehicle drives to a retreat location without getting stuck. With such a technology as just described, when driving can be performed with the remaining normal sensors, the failed vehicle can be moved to a retreat place, and a disadvantage that the driving path is blocked can be avoided.

PRIOR ART DOCUMENTS

Patent Documents

Patent Document 1: JP-2007-323675-A
Patent Document 2: JP-2010-176283-A

SUMMARY OF THE INVENTION

Problem to be Solved by the Invention

However, in such an autonomous driving system as disclosed in Patent Document 1 described above, a situation that recovery of a failed vehicle which stops on a driving path from the situation cannot be performed automatically, and for a period until repair of the failed vehicle is completed and the vehicle moves, the section remains in a state in which the speed is limited therein. Therefore, in such a case that the transport path is a long one track, the interval makes a bottleneck and drops the overall movement efficiency.

Further, when control based on occlusion control is performed in order to enhance the safety, other vehicles cannot drive in the section as long as the stopping vehicle exists in the occlusion section, and this gives rise to a problem that succeeding vehicles come to successively stop in entire sections connecting to the section. As different solving means, in order to avoid such a problem as just described in occlusion control, also a method is available wherein, when the vehicle stops due to performance degradation of a sensor, the map is updated to move an occlusion section to a position at which no stopping vehicle exists to re-set an occlusion section. However, that a space for avoidance is provided on the overall transport path is not desirable also from a viewpoint of the cost, and it cannot be considered that the method as just described is a good solution.

Further, in such an autonomous movement apparatus as disclosed in Patent Document 2 described above, even if some abnormality occurs with some of a plurality of sensors, it is evaluated that remaining sensors are normal and the failed vehicle drives to a retreat position using the remaining sensors. However, autonomous driving of a large-size dump has a problem in terms of the safety in that normal driving is continued in a state in which the obstacle detection performance is degraded during driving to the retreat position. Further, a concept of an occlusion section is not discussed in the present technology, and the safety is further degraded in that driving is continued irrespective of whether or not there exists a driving vehicle or the like therearound.

The present invention has been made in view of such a subject as described above, and a vehicle which autonomously drives under the control in which occlusion control is performed is characterized in that, even if an obstacle detection performance is degraded by dirt or a failure of an external world recognition sensor, a drops of the overall movement efficiency can be prevented.

Means for Solving the Problems

In order to solve the subject described above, according to the present invention, an autonomous driving vehicle which autonomously drives with an external world recognition sensor is configured such that it includes map information storage means configured to store map information of a driving path of the vehicle therein, sensor state evaluation means configured to evaluate a state of performance degradation of a sensor, movement obstacle evaluation means configured to evaluate, from a position at present of the vehicle and the map information, an influence on movement of other vehicles when the vehicle stops at the position, and speed limit value setting means configured to set a limit value to a speed when the vehicle drives in response to a result of the evaluation of the sensor state evaluation means, and wherein, when the result of the evaluation of the sensor state evaluation means is within a first range, if a result of the evaluation of the movement obstacle evaluation means is without a second range, then a speed limit value is set based on the result of the evaluation of the sensor state evaluation means and then driving is continued within a range of the limit value.

Further, according to the present invention, the autonomous driving vehicle is configured such that the speed limit value setting means performs control of a steering angle, and, when the result of the evaluation of the sensor state evaluation means is within the first range, if the result of the evaluation of the movement obstacle evaluation means is without the second range, a steering angle limit value is set based on the result of the evaluation of the sensor state evaluation means and then driving is continued within a range of the limit value.

Further, according to the present invention, the autonomous driving vehicle is configured such that, when the result of the evaluation of the movement obstacle evaluation means is within the second range, the vehicle is stopped.

Further, according to the present invention, the autonomous driving vehicle is configured such that a detection area of the sensor is divided into a plurality of divisional areas and a weight is set individually to the areas and an evaluation value based on dirt of the sensor or a degree of failure is calculated for each of the areas, and the result of the evaluation by the sensor state evaluation means is obtained using a value obtained by adding a value obtained by weighting corresponding to the area to the evaluation value.

Further, according to the present invention, the autonomous driving vehicle is configured such that, when the result of the evaluation of the sensor state evaluation means satisfies a predetermined condition, the vehicle moves to a destination which is outside an occlusion section using a value of the set limit value of the steering angle.

Further, according to the present invention, the autonomous driving vehicle is configured such that, when the result of the evaluation of the sensor state evaluation means in a state in which the result satisfies a predetermined condition, a notification of the state is issued to an external control center, and route information to a destination transmitted from the control center is received.

Further, in order to solve the subject described above, according to the present invention, an autonomous driving system for performing control by occlusion control to move a plurality of autonomous driving vehicles by a sensor is configured such that it includes
sensor state evaluation means configured to detect a state of performance degradation of the sensor to the vehicle, rule storage means configured to store a rule which prescribes a motion to be performed by the vehicle based on a result of the evaluation of the sensor state evaluation means, and rule execution means configured to perform a motion in accordance with the rule in response to the result of the sensor state evaluation means, the sensor state evaluation means, rule storage means and rule execution means being provided on the vehicle, that the vehicle or the control center includes map information storage means configured to store map information, and occlusion section decision means configured to decide whether or not a position at present of the own vehicle is within an occlusion section based on positional information of the own vehicle, and wherein the rule of the rule storage means includes a motion for setting a limit value to a speed at least based on the result of the evaluation of the sensor state evaluation means such that, when the result of the evaluation of the sensor state evaluation means satisfies a predetermined condition, if the position at present of the own vehicle is within the occlusion section, the limit value to the speed set in the rule is set and the vehicle drives within the set speed range to the outside of the occlusion section.

Further, according to the present invention, the autonomous driving system is configured such that rule creation means configured to create the rule is provided in the control center, and the rule created by the rule creation means is transmitted from the control center to and utilized by an autonomous driving vehicle.

Further, according to the present invention, the autonomous driving system is configured such that a detection area of the sensor is divided into a plurality of divisional areas and a weight is set individually to the areas and an evaluation value based on dirt of the sensor or a degree of failure is calculated for each of the areas, and the result of the evaluation by the sensor state evaluation means is obtained using a value obtained by adding a value obtained by weighting corresponding to the area to the evaluation value.

Further, according to the present invention, the autonomous driving system is configured such that, when the result of the evaluation of the sensor state evaluation means satisfies a predetermined condition, a notification of the satisfaction is issued to the control center, and the control center searches for a destination on the outside of the occlusion section and transmits route information to the destination to the vehicle.

Further, according to the present invention, the autonomous driving system is configured such that, when the result of the evaluation of the sensor state evaluation means satisfies a predetermined condition, the vehicle drives to a destination on the outside of the occlusion section using a value of a limit value to a steering angle set by the rule execution means.

Further, according to the present invention, the autonomous driving system is configured such that, when a destination is to be selected by the control center, a suitable place is selected from the map information and a section which is not the occlusion section is newly provided to update the map information and then route information to the destination in the section is transmitted to the vehicle.

Further, according to the present invention, the autonomous driving system is configured such that sensor state storage means configured to store a history of a value evaluated by the sensor state evaluation means at predetermined intervals is provided and a next delimitation time point is predicted based on route information transmitted from the control center at a predetermined timing; an evaluation value at the delimitation time point is estimated from the history of the evaluated value; when the estimated value exceeds a range set in advance, a maintenance request is transmitted to the control center; and the control center transmits route information to a position at which maintenance can be performed to the vehicle.

Effect of the Invention

With the present invention, when performance degradation occurs with the sensor, evaluation of a type or a performance of a utilizable sensor is performed, whereby degeneration operation in a state in which the speed and the steering angle are limited can be performed in accordance with the evaluation. In addition, since the influence on other vehicles when the vehicle stops at a position at present can be evaluated taking the width and the state of a transport path at the position at present into consideration, the vehicle can be stopped after it drives by degeneration operation to a position at which the overall operation is not obstructed. Therefore, even if performance degradation of the sensor occurs, an effect can be achieved that the influence on the other vehicles is suppressed to a minimum level.

Further, with the present invention, even if performance degradation occurs with the sensor within a section within which control is to be performed by occlusion control, by performing evaluation of the type and the performance of a utilizable sensor, degeneration operation in a state in which the speed and the steering angle are limited based on the evaluation can be performed. In the present invention, it is decided whether or not a section in which the vehicle is driving from the position at present is an occlusion section, and even if the sensor performance degrades, stopping within the occlusion section into which a different vehicle cannot advance is avoided. Consequently, an effect can be achieved that, also upon performance degradation of the sensor, the influence on the other vehicles is limited to a minimum level and such a state that movement of all vehicles is stopped can be avoided. It is a characteristic that the occlusion section is a section into which it is guaranteed that any other vehicle cannot advance and high safety is maintained also in driving by degeneration operation upon sensor performance degradation.

Further, with the present invention, a rule to be performed by the vehicle upon sensor performance degradation can be created and updated on the control center side, and an effect can be achieved that an optimum rule can be set from both sides of the transportation efficiency and the safety in response to information such as the shape of the transport path, the state of the road surface, the weather and the movement density of driving vehicles gasped by the center. Further, since updating of the rule can be performed freely through communication also during movement of the vehicles, the rule can be set based on information which varies every moment.

Further, with the present invention, evaluation by dirt of a portion of a lens at which the influence on detection of an obstacle or the road surface is little can be calculated so as to be low, and an effect can be achieved that stopping or occlusion operation by lens dirt within a range within which the driving suffers from no trouble can be avoided.

Further, with the present invention, since a destination for performing retreat upon sensor performance degradation can be selected by the control center which grasps a movement situation, an effect can be achieved that more flexible destination selection can be performed such that, where the distance to a succeeding different vehicle is sufficiently long, not the nearest retreat place but a different retreat place at which maintenance can be performed even if the distance increases a little is selected as a destination.

Further, with the present invention, it is possible to check a route to a retreat destination in advance and confirm whether or not the vehicle can drive along a route to the destination within the range of the set limit value to the steering angle. Consequently, an effect can be achieved that a trouble that the vehicle is disabled for driving by the limitation of the steering angle during driving to the retreat place by occlusion operation is prevented.

Further, with the present invention, even in such a case that such a trouble occurs that there is no retreat place which can be reached from the position of the vehicle at present or the distance to a retreat place is so great that excessive time is required to reach the retreat place, by temporarily setting a link for retreat to a place at which the road width is partially great and determining the place as a destination, the vehicle can retreat quickly and degradation of the overall movement efficiency is prevented. Further, where the transport path is long, if a retreat place is set at various locations, then the size of the map data increases and the communication load relating to updating and so forth of the map data is increased. However, with the present invention, an effect that such a trouble as just described is prevented can be achieved.

Further, with the present invention, since it is possible to carry out maintenance by predicting degradation of a sensor performance in advance, an effect can be achieved that, when the sensor is smudged gradually by accumulation or the like of dust and so forth to degrade a performance thereof, such a situation that the vehicle performs stopping or occlusion operation due to dirt and so forth of the sensor can be prevented and the overall movement efficiency can be raised.

BRIEF DESCRIPTION OF THE DRAWINGS

FIG. 11 depicts a motion determination rule when the sensor performance degrades.

MODES FOR CARRYING OUT THE INVENTION

In the following, embodiments are described with reference to the drawings.

First Embodiment

First, a first embodiment is described. In the present embodiment, in an autonomous driving vehicle which includes a plurality of sensors to detect an obstacle or a running road surface, a state of dirt or a failure of the sensors is evaluated, and at a point of time at which the evaluation value becomes equal to a predetermined value, an influence degree upon movement of other vehicles when the autonomous driving vehicle stops at a position at the present point of time. Then, if it is decided that the influence is significant, then driving according to a degeneration mode in which the speed or the steering angle is limited is performed to make it possible for the autonomous driving vehicle to move to a retreat position at which the influence of stopping is less significant.

Figure 1:
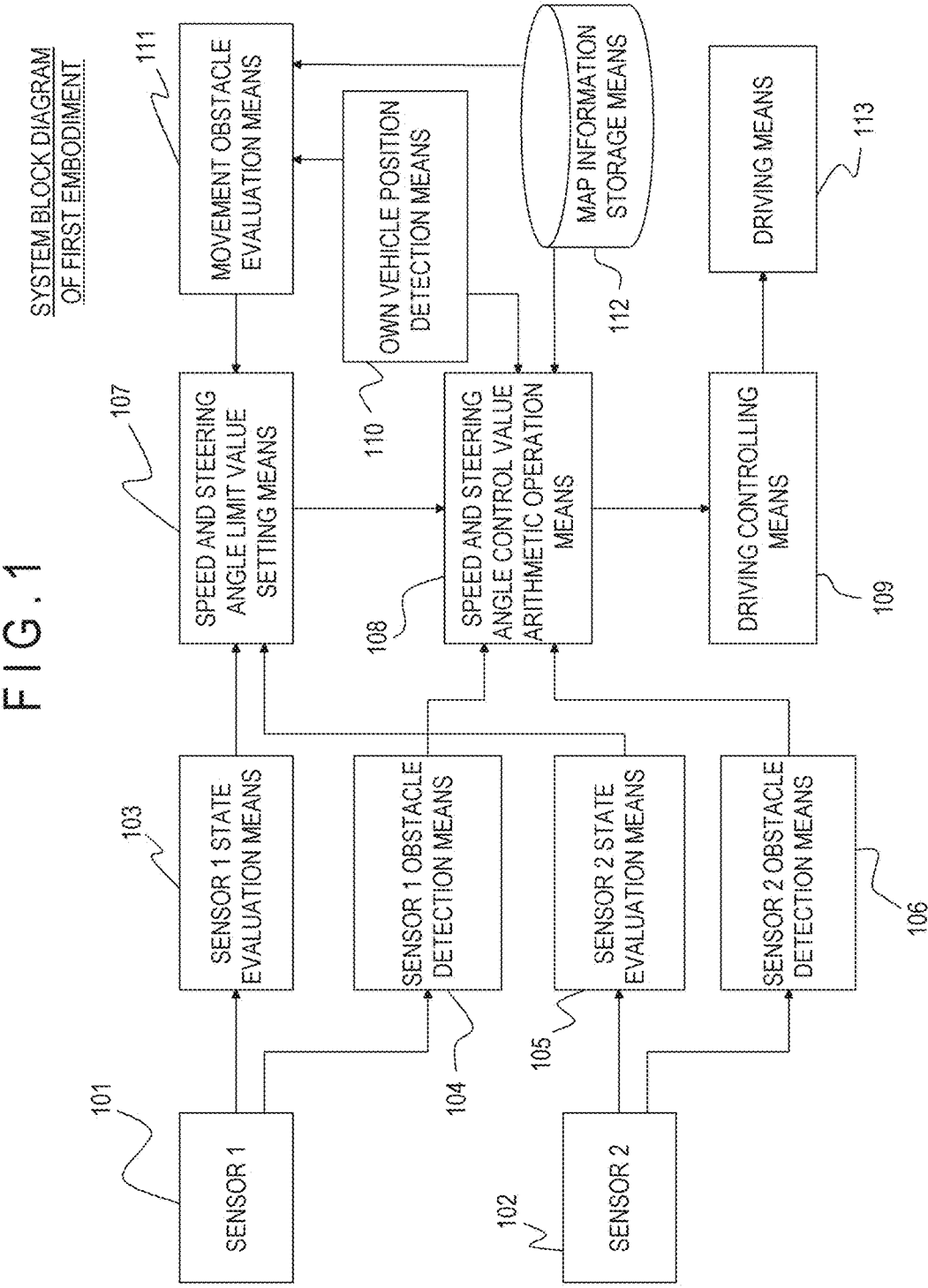
FIG. 1 is a system block diagram of a first embodiment.

FIG. 1 depicts a block diagram of a system configuration of the first embodiment. The autonomous driving vehicle of the configuration depicted in FIG. 1 determines, in order to perform driving autonomously on the basis of an own vehicle position determined by own vehicle position detection means 110 and routing information to a destination with reference to map information of map information storage means 112, instruction values for the speed and the steering angle by speed and steering angle control value arithmetic operation means 108. Driving controlling means 109 controls driving means 113 to operate for driving on the basis of the instruction values.

In the system configuration depicted in FIG. 1, as sensors for detecting an obstacle and so forth, two sensors including a sensor 1 (101) and a sensor 2 (102) are provided, and sensor 1 obstacle detection means 104 and sensor 2 obstacle detection means 106 are provided in order to detect an obstacle from outputs of the sensors. Information of an obstacle detected by them is inputted to the speed and steering angle control value arithmetic operation means 108, and if an obstacle or the like is detected and there is the possibility of collision, then the speed and steering angle control value arithmetic operation means 108 calculates and sends values of the speed and the steering angle with which collision is avoided to the driving controlling means 109 thereby to avoid collision with the detected obstacle and implement safe autonomous driving.

As the sensor 1 (101) and the sensor 2 (102), a sensor which utilizes image recognition using a camera, a layer or a millimeter wave is used. The sensors sometimes suffer, together with driving, from degradation in performance from various factors such as adhesion of dirt, a failure or incidence of direct light, and especially in the case of a mine dump used in a harsh environment, the influence is remarkable. If a performance of a sensor drops, then such a trouble occurs that an obstacle cannot be detected or that deceleration occurs at a wrong place by erroneous detection. Since such troubles are, in a mine dump which performs unattended autonomous driving, significant problems which directly lead to an accident, such a countermeasure as to detect a state of a sensor and stop, if a failure of the sensor is detected, the autonomous driving.

Incidentally, a transport path of a mine is long in distance and includes many places at which only a necessary and sufficient road width for back and forth movement of a dump is developed. Therefore, if the autonomous driving vehicle stops its running due to degradation of the sensor performance, then there is the possibility that an event that not only the vehicle but also all succeeding vehicles are disabled to run may occur and the transportation may stop completely. In the mine, the entire production is stagnated by the stopping of the transportation, resulting in significant loss. Therefore, in the first embodiment of the present invention, in order to prevent, even if some sensor suffers from a trouble and the detection performance of an obstacle or the like by the sensor drops, the autonomous driving vehicle from blocking the transport path to make an obstacle to driving of other vehicles, the autonomous driving vehicle is configured such that it includes sensor 1 state evaluation means 103 and sensor 2 state evaluation means 105 which evaluate the state of the sensors in regard to a trouble and output a degree of the trouble, speed and steering angle limit value setting means 107 for deciding, from results of the evaluation means, effective ability of the sensors at the point of time and setting limit values to a speed and a steering angle with which the autonomous driving vehicle can drive in safety within the range of the remaining abilities, and movement obstacle evaluation means 111 for evaluating an influence on a succeeding vehicle when the autonomous driving vehicle at the position at present from the position at present and map information. The sensor 1 state evaluation means 103 and the sensor 2 state evaluation means 105 analyze an image, a detection point group and so forth to calculate an evaluation value relating to adhesion of dirt to or failure of the sensors. The evaluation value is calculated for each sensor, and the speed and steering angle limit value setting means 107 detects a trouble state of the sensor in response to a combination of the evaluation values and determines limit values to the speed and the steering angle corresponding to the trouble states.

The movement obstacle evaluation means 111 searches for information, for example, of the road width or the state of the road surface from the map information and the position at present, determines an evaluation value from a point of view of ease of overtaking by a succeeding vehicle when the autonomous driving vehicle stops at the position at present, determines, if the value is equal to or higher than a predetermined value, namely, if it is decided that, when the autonomous driving vehicle stops at the location at present, it has a significant bad influence on the driving of a succeeding vehicle, control values for the speed and the steering angle within the ranges of the limit values to the speed and the steering angle described above, and continues the driving of the autonomous driving vehicle. This is a driving state in which the safety margin is assured by an increased amount corresponding to the degradation of the performance of the sensor in comparison with a state in which ordinary driving is possible, and this state is hereinafter referred to as degeneration operation.

On the other hand, in such a case that, for example, the road width is sufficiently great and, even if the autonomous driving vehicle remains stopping at the location at present, a succeeding vehicle can take over the own vehicle readily, the autonomous driving vehicle does not perform degeneration operation but stops at the location.

Further, even while driving is continued by degeneration operation, evaluation by the movement obstacle evaluation means 111 is performed regularly, and at a position at which the evaluation value becomes lower than the predetermined value, the driving is stopped.

Figure 2:
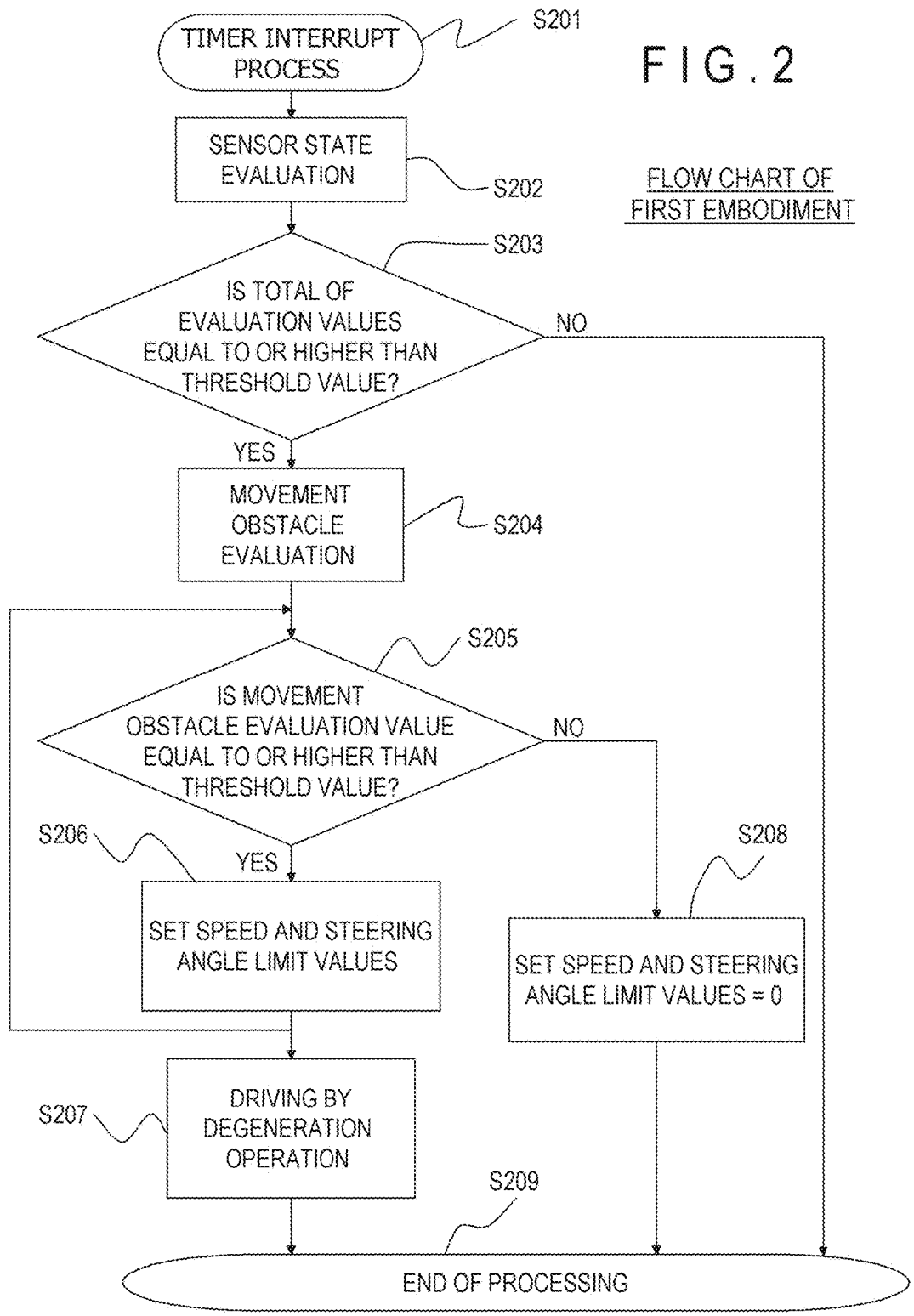
FIG. 2 is a flow chart illustrating a flow of processing of the first embodiment.

Now, the substance of processing is described with reference to a flow chart of the first embodiment depicted in FIG. 2. First, since it is necessary to regularly perform evaluation of the performance degradation of the sensors, processing is activated by timer interrupt as indicated at step S201. At next step S202, the degradation state of the sensor performance of the sensor 1 (101) and the sensor 2 (102) is evaluated. The evaluation value is determined for each of the sensors, and how to determine the evaluation value is described in connection with an example hereinafter described with reference to FIG. 10. At step S203, it is decided from the obtained evaluation values whether or not it is possible to normally detect, with the state of the sensors at present, an obstacle or the like to perform autonomous driving. Where a plurality of sensors are involved, since an obstacle can be detected from characteristics different from each other, in the example depicted in FIG. 2, the sum of the evaluation values is determined. Then, if the sum value exceeds a threshold value set in advance, namely, if the sum of values indicative of degrees of a trouble of the two sensors is greater than the set value, then it is determined that an external world recognition sensor suffers from a trouble, and the processing advances to step S204. On the other hand, if the value is equal to or lower than the threshold value at step S203, then it is determined that the degree of the trouble is low, and the processing advances to a process end at step S209.

The process at step S204 is that by the movement obstacle evaluation means 111 of FIG. 1 and is a process of determining, when the autonomous driving vehicle stops at the location at present as described above, an evaluation value of the influence to be had on movement of a succeeding vehicle. Thereafter, the processing advances similarly as in the process described hereinabove with reference to FIG. 1, and it is decided at step S205 whether or not the evaluation value determined at step S204 is equal to or higher than the threshold value. Then, if the evaluation value is equal to or higher than the threshold value, namely, if stopping at the location at present has an influence on movement of a succeeding vehicle, then limit values to the speed and the steering angle are set at step S206, and driving is continued by degeneration operation. On the other hand, if the evaluation value is equal to or lower than the threshold value at step S205, then it is decided that, even if the autonomous driving vehicle stops at the location at present, this does not have a significant influence on a succeeding vehicle, and the limit values to the speed and the steering angle are set to "0," namely, to those in a stopping state, at step S208, thereby ending the processing (S209).

It is to be noted that, even during driving by degeneration operation, the present process is executed regularly by timer interrupt at step S201, and at a point of time at which the state of the sensors is restored and the evaluation value of the sensor stage becomes a low value or the autonomous driving vehicle moves to a place at which the road width is great until the movement obstacle evaluation value becomes equal to or lower than the threshold value at step S205, the driving is stopped and the processing is ended (S209).

Second Embodiment

Now, a second embodiment is described. The present embodiment is an autonomous driving system which performs autonomous driving of a plurality of vehicles under traffic control by which the safety is raised by occlusion control, and each vehicle includes a plurality of sensors and can avoid a failure such as collision of a plurality of vehicles while detecting an obstacle or the running road surface. In the present embodiment, the autonomous driving system is configured such that, even when performance degradation of a sensor is detected within an occlusion section, the autonomous driving vehicle does not stop within the occlusion section but continues driving to the outside of the occlusion section fully and stops at the place. Therefore, the state of dirt or a failure of a sensor is evaluated, and at a point of time at which the evaluation value satisfies a predetermined condition, it is decided whether or not the location at present of the own vehicle is within an occlusion section. Then, if the location at present is within an occlusion section, then the autonomous driving vehicle changes over its operation to degeneration operation by which limitation to the speed and the steering angle in response to the detection ability of the sensor is performed on the basis of the evaluation value, and after the driving is performed to the outside of the occlusion section fully, the autonomous driving vehicle stops.

Figure 3:
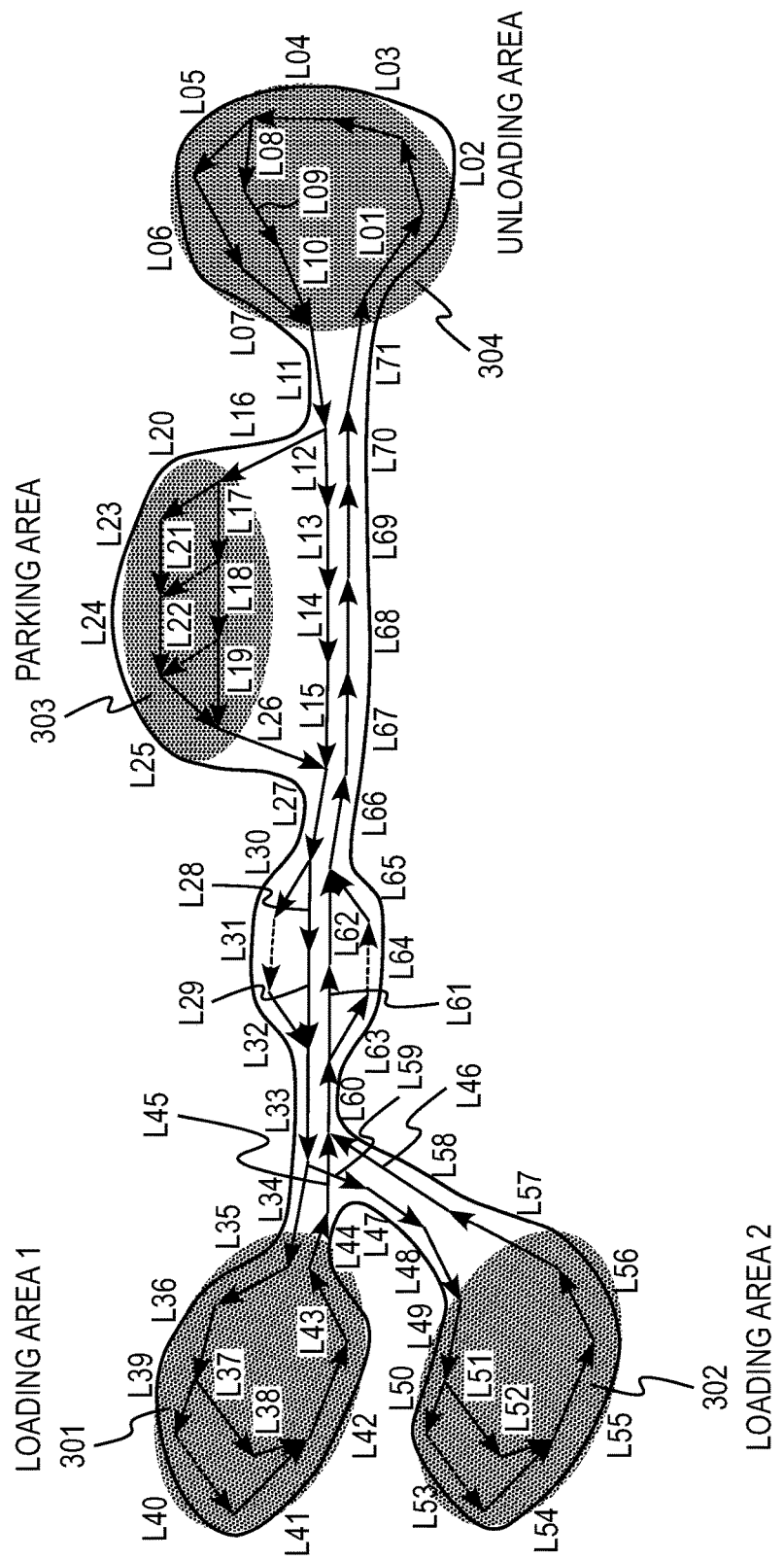
FIG. 3 is an explanatory view of occlusion control of a second embodiment.

FIG. 3 is an explanatory view depicting a state of a transport path by an occlusion section of the second embodiment. As depicted in FIG. 3, in a workspace of a mine, such areas as a loading area 1 (301) and a loading area 2 (302) in which sediment and minerals are mined and loaded into a dump, an unloading area 304 in which a facility for unloading the loaded sediment and processing the sediment is provided, a parking area 303 in which vehicles which are not used or are being in maintenance are parked and so forth are provided in a spaced relationship from each other. An autonomous driving dump travels between the areas to transport sediment or minerals.

The autonomous driving system of the second embodiment is configured such that a control center controls the driving path and the speed of each autonomous driving vehicle to allow the autonomous driving vehicle to run safely. Since a mine dump is a very large vehicle which is huge in size and is very great also in load capacity and whose weight in a loading state exceeds 200 tons, a sudden movement thereof is difficult not only in braking but also in steering. As a mechanism for allowing such a large vehicle to run safely, in the field of railways, occlusion control has been performed. In particular, a driving lane is divided into sections of an appropriate length, and the individual sections are controlled as occlusion sections into each of which only one vehicle is permitted to advance thereby to enhance the safety with certainty.

In the example depicted in FIG. 3, each section is represented as a link having information in an advancing direction. Among the links, a link (L01, L02 or the like) indicated by a solid line arrow mark represents an occlusion section, and a link indicated by a broken line arrow mark represents a section other than the occlusion sections.

Links L20, L21, L22 of broken line arrow marks in the parking area 303 are sections in which a vehicle is to be left stopped in order to perform parking or maintenance, and even if a vehicle stops here, the autonomous driving vehicle can driving in a different section and pass by this area. Also the loading area 1 (301), loading area 2 (302) and unloading area 304 have sections L40, L53 and L09 indicated by broken line arrow marks. For example, even if a vehicle stops in the section L40, a different vehicle can continue driving passing the occlusion sections L37 and L38.

Further, portions having an increased road width are provided midway of the transport path, and sections L31 and L64 for retreat are provided at the portions.

Figure 4:
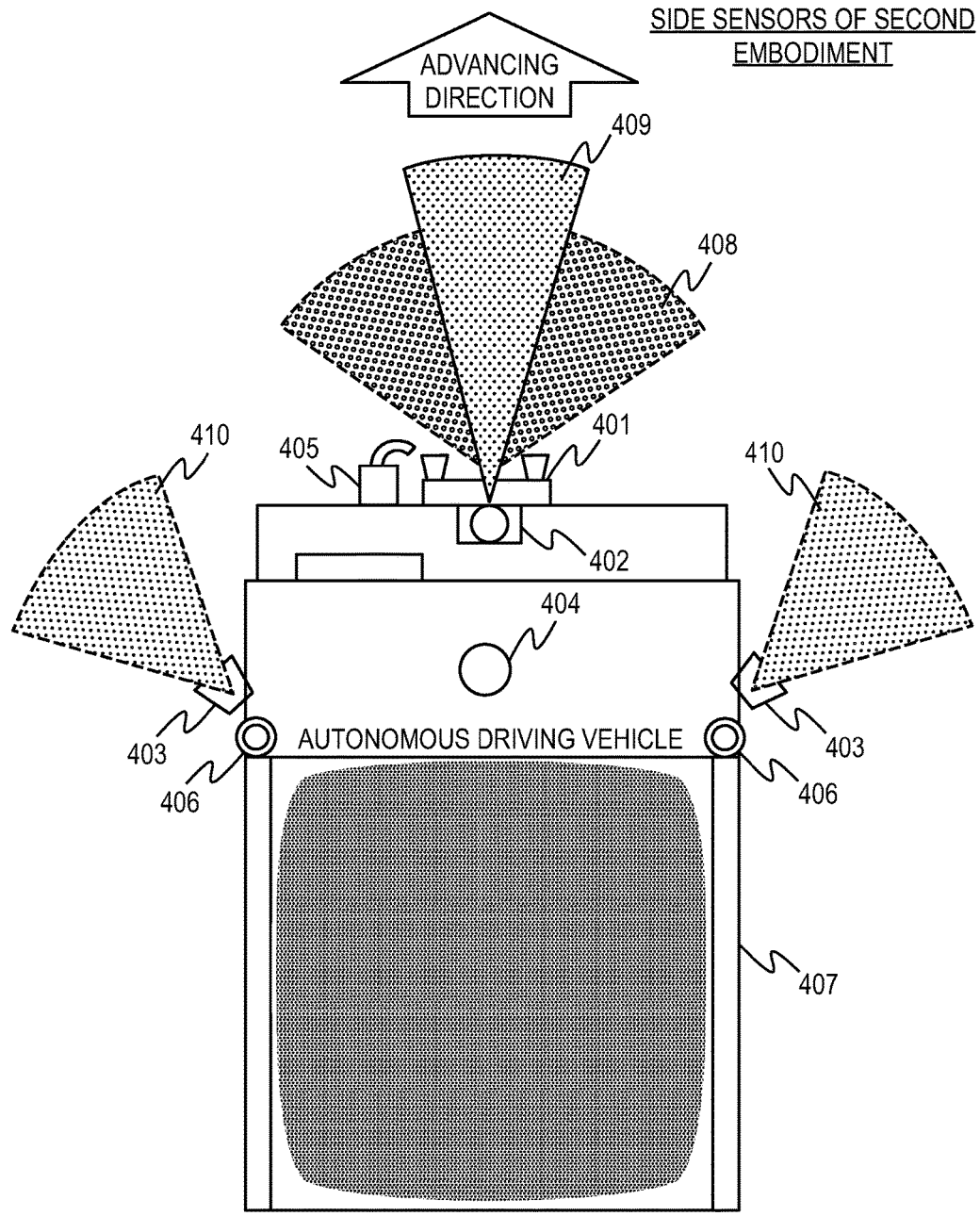
FIG. 4 is a layout view of vehicle side sensors of the second embodiment.

FIG. 4 is a view depicting disposition of sensors on a vehicle of the second embodiment. In the example depicted in FIG. 4, as sensors for external world recognition, a stereo camera 401 and a Light Detection And Ranging (LIDAR) 402 are provided on the front face of the vehicle body, and millimeter wave radars 403 are provided at left and right portions of the vehicle body as sensors for detecting a sideward obstacle. Detectable areas for an obstacle by the stereo camera 401, LIDAR 402 and millimeter wave radars 403 are indicated as areas 408, 409 and 410 indicated by gray. The stereo camera 401 is one of very useful sensors which can measure a distance to an object from two camera images and can identify an obstacle on an image, and is characterized in that the detection area is wide. The detection area 409 of the LIDAR 402 has a comparatively long detection distance although it varies depending upon the scanning angle. However, information obtained originates from spatially discrete positions. Further, it is recognized that the millimeter wave radars 403 are installed for oblique directions for detection in a forwardly sideward direction, and the detection area 410 of the millimeter wave radars 403 is an area in a forwardly sideward direction.

Further, the autonomous driving vehicle of FIG. 4 is configured such that it includes a GPS apparatus 404 for measuring the location at present of the own vehicle, and cleaning means 405 for cleaning a lens face if the stereo camera 401 or the LIDAR is contaminated with dust, mud or the like.

A sensor performance degradation indication means 406 is an element like an emergency lamp attached, for example, to an upper portion of a dump vessel and has an effect that, by performing, when degeneration operation is performed due to sensor performance degradation, indication from the indication means, it becomes easier to find out a vehicle having a failure from a manned vehicle which is driving.

Figure 5:
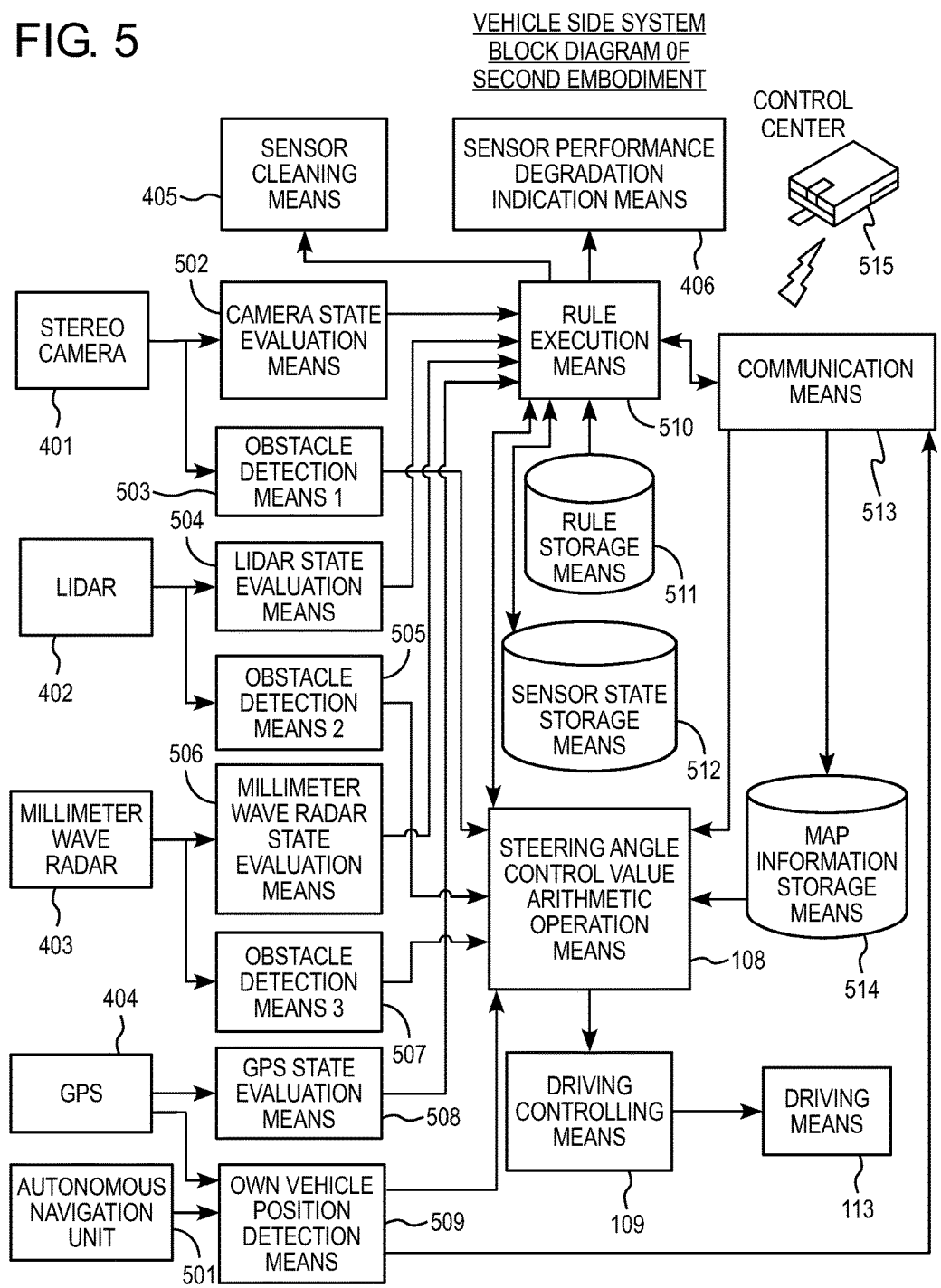
FIG. 5 is a vehicle side system block diagram of the second embodiment.

FIG. 5 is a block diagram of a vehicle side system configuration of the second embodiment.

Speed and steering angle control value arithmetic operation means 108, driving controlling means 109 and driving means 113 are similar to those of the first embodiment depicted in FIG. 1. In the present embodiment, as sensors for external world recognition, a stereo camera 401, a LIDAR 402 and millimeter wave radars 403 described also with reference to FIG. 4 are provided, and as means for detecting an obstacle from them, obstacle detection means 1 (503), obstacle detection means 2 (505) and obstacle detection means 3 (507) are provided. Further, as means for evaluating performance degradation of the sensors by adhesion of dirt or a failure, camera state evaluation means 502, LIDAR state evaluation means 504 and millimeter wave radar state evaluation means 506 are provided and determine evaluation values of a state of the sensors relating to the dirt and so forth. The vehicle side system in the second embodiment further has the GPS apparatus 404 and an autonomous navigation unit 501 used to detect the current location of the vehicle. GPS state evaluation means 508 evaluates the satellite disposition of the GPS, a reception state of radio waves and so forth and obtains the reliability of the measurement result of the absolute value by the GPS as an evaluation value.

Rule execution means 510 receives, as inputs thereto, evaluation values obtained by the camera state evaluation means 502, LIDAR state evaluation means 504, millimeter wave radar state evaluation means 506 and GPS state evaluation means 508 and determines a motion to be carried out in accordance with a rule stored in rule storage means 511 and then carries out the motion. As the motion thereupon, such processes as cleaning of the sensors, setting of degeneration operation by setting of limit values to the speed and the steering angle, issuance of a notification to the control center and so froth are available. Further, communication means 513 receives map information, driving route information and so forth from a control center 515 and is further used when issuance of a notification of sensor performance degradation, transmission of the position at present and so forth to the control center are performed. The rule stored in the rule execution means 510 is hereinafter described with reference to FIG. 11.

Figure 6:
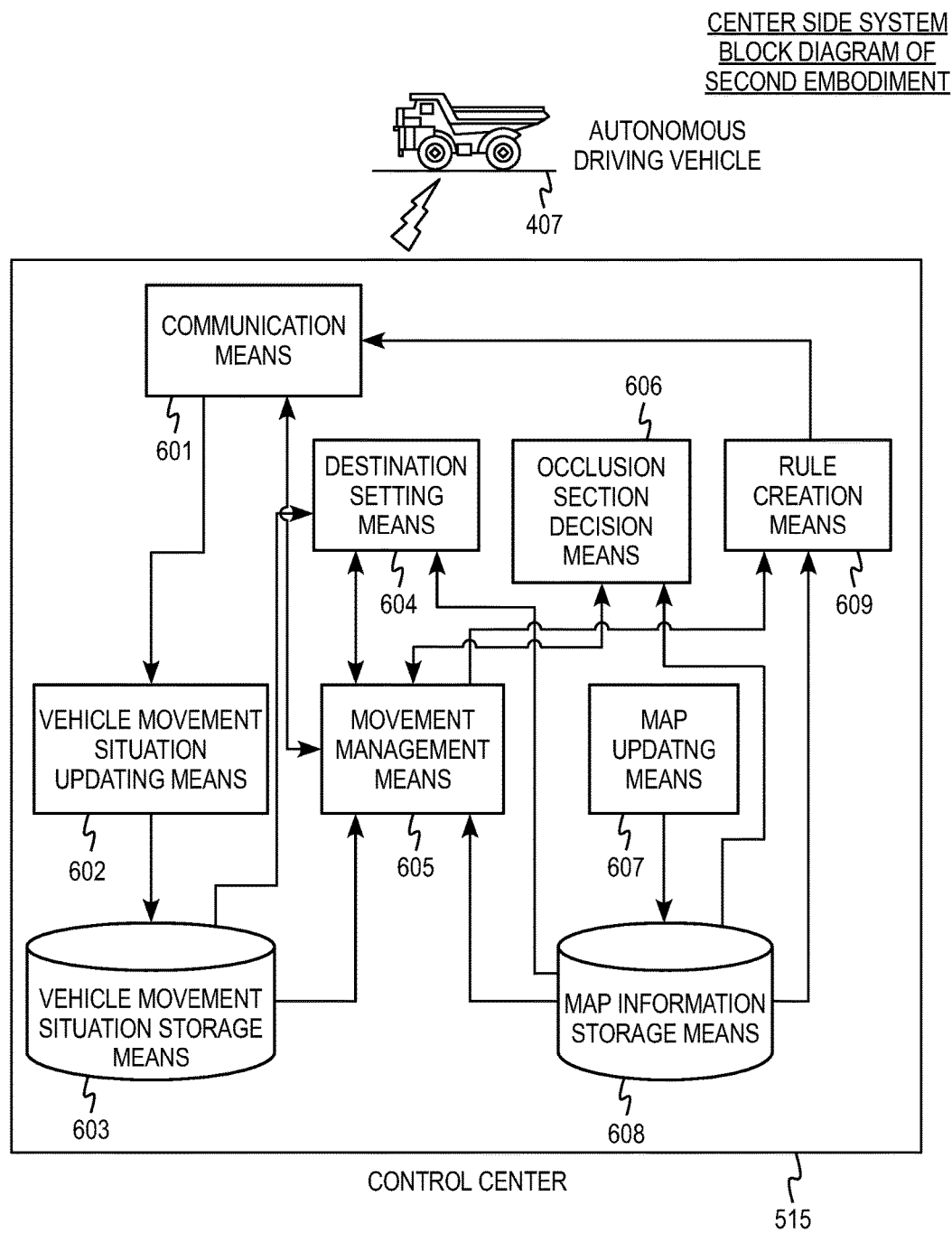
FIG. 6 is a center side system block diagram of the second embodiment.

FIG. 6 is a block diagram of a center side system configuration of the second embodiment.

Communication means 601 is used to transmit map information or a driving route, a rule stored in the rule storage means 511 and so forth to an autonomous driving vehicle of a control target. Movement management means 605 has a function of performing control of an autonomous driving vehicle using the position at present of an autonomous driving vehicle and the map information. The movement management means 605 reads out the position and the movement situation of vehicles stored in vehicle movement situation storage means 603 or the map information stored in map information storage means 608 to generate instruction information for movement control.

Vehicle movement situation updating means 602 writes information of the position at present of the vehicles or occlusion sections in which the vehicles drive at present received through the communication means 601 into the vehicle movement situation storage means to update the information. Further, map updating means 607 updates the map when the shape of a transport path or the position for loading or unloading changes, and performs, in such a case that performance degradation of a sensor is detected in an autonomous driving vehicle under control thereof and an appropriate retreat place for retreat of the autonomous driving vehicle is not found, also a motion for updating the map in order to temporarily set a retreat section. Destination setting means 604 sets a destination again when an event occurs during ordinary movement such as completion of loading or unloading or when sensor performance degradation of an autonomous driving vehicle or the like is detected.

Occlusion section decision means 606 decides, when sensor performance degradation of an autonomous driving vehicle is detected, whether or not the position at present of the vehicle is within an occlusion section. When sensor performance degradation is detected, if it is decided by the occlusion section decision means 606 that the position at present is within an occlusion section, then the destination setting means 604 searches for a retreat place for the vehicle and sets the searched out retreat place as a destination of the vehicle.

While, in the present embodiment, the occlusion section decision means 606 is provided on the center side, also it is possible to provide the occlusion section decision means 606 provided alternatively on the autonomous driving vehicle side to make it possible to identify whether each section of the map information is an occlusion section or a non-closing position such that the decision is performed on the vehicle side.

Rule creation means 609 has a function of creating, when sensor performance degradation of an autonomous driving vehicle is detected, a rule for prescribing a motion to be executed by the rule execution means 510. In order to achieve both of the movement performance and the safety upon sensor performance degradation, the rule is updated so as to be optimum for the weather, mining minerals, the shape and state of the driving path and so forth and is distributed to the vehicle. In the present embodiment, the information of the weather, mining minerals, the shape and the state of the driving path and so forth to be used for rule creation is stored as part of the map information into the map information storage means 608.

Figure 7:
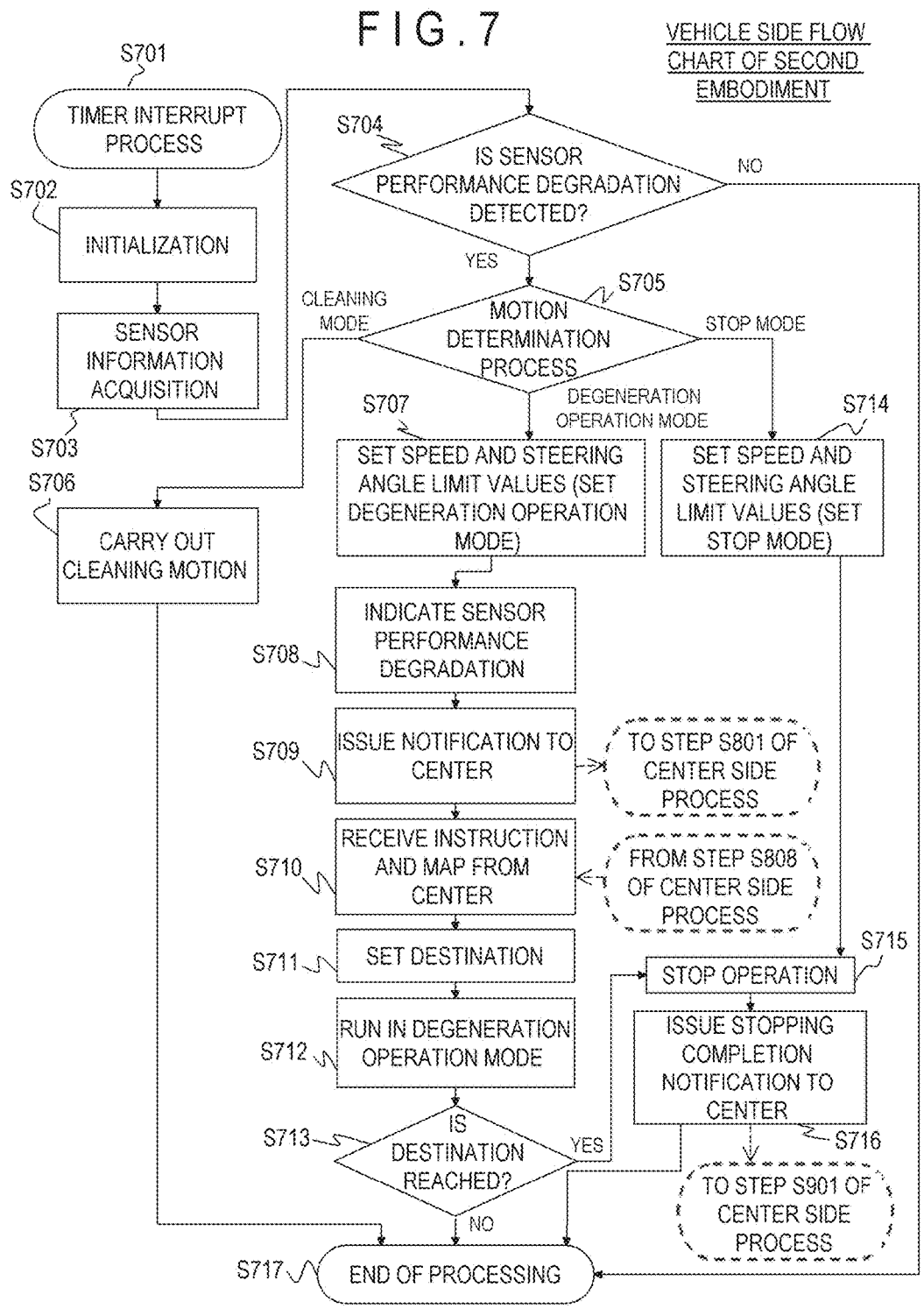
FIG. 7 is a vehicle side flow chart of the second embodiment.

FIG. 7 is a flow chart illustrating a flow of processing on the vehicle side of the second embodiment. Since it is necessary to regularly carry out the detection process of sensor performance degradation, the processing is started by timer interrupt at step 701. Then at step S702, initialization of processing is performed to prepare flags for cleaning and center notification. At next step S703, an evaluation value of performance degradation of each sensor by the sensor state evaluation means for the sensor is determined. At next step S704, sensor performance degradation is decided from the evaluation values determined at step S703, and if sensor performance degradation is detected, then the processing advances to next step S705. If the autonomous driving vehicle is running already in a degeneration operation mode, then at step S704, not ordinary detection of performance degradation of the sensors is performed, but only transition to a stopping mode having a higher evaluation value is checked.

On the other hand, if sensor performance degradation is not detected at step S704, then the processing advances to step S717, at which the processing is ended. If the processing advances to step S705, then a motion to be performed is selected on the basis of the evaluation values of the sensor states acquired at step S703, and the processing advances to a corresponding processing step.

When the evaluation value is comparatively low, namely, when the degree of dirt or failure of the sensors is low, a cleaning motion at step S706 is carried out. If an effect by cleaning is not obtained due to oil soil, lens cracking, incidence of direct light or the like, then the evaluation value further increases, and a degeneration operation mode is entered. Then at step S708, an indication is performed from the sensor performance degradation indication means 406 depicted in FIG. 4 and the safety is ensured for manned driving vehicles. Thereafter, a notification of detection of sensor performance degradation is issued to the center at step S709, and on the center side, it is decided whether or not the position at present is within an occlusion section. Then, if the position at present is within an occlusion section, then route information for retreat is transmitted from the center side.

Here, if an evaluation value of the sensor state evaluation or a limit value to the steering angle set in the degeneration mode is transmitted to the center side together with a detection notification of sensor performance degradation, then the center side can search for a reachable retreat place within the limited range of the steering angle. Thus, an effect that such a trouble that the autonomous driving vehicle cannot reach the designated retreat place due to the steering angle limitation can be avoided.

Then, the processing advances to step S710, at which an instruction and updated map information from the control center are received. Here, the instruction from the control center is one of a running instruction in a degeneration operation mode and a stopping instruction at the position at present.

On the autonomous driving vehicle side, the destination for retreat received newly is set at step S711, and driving in a degeneration operation mode is performed at step S712. At step S713, it is decided whether or not the destination is reached, namely, whether or not the location at present is the set destination. If the destination is reached, then an instruction to stop operation is issued to the vehicle at step S715, and after the vehicle stops fully, a stopping completion notification is issued to the center at step S716, whereafter the processing advances to a processing end at step S717.

Figure 8:
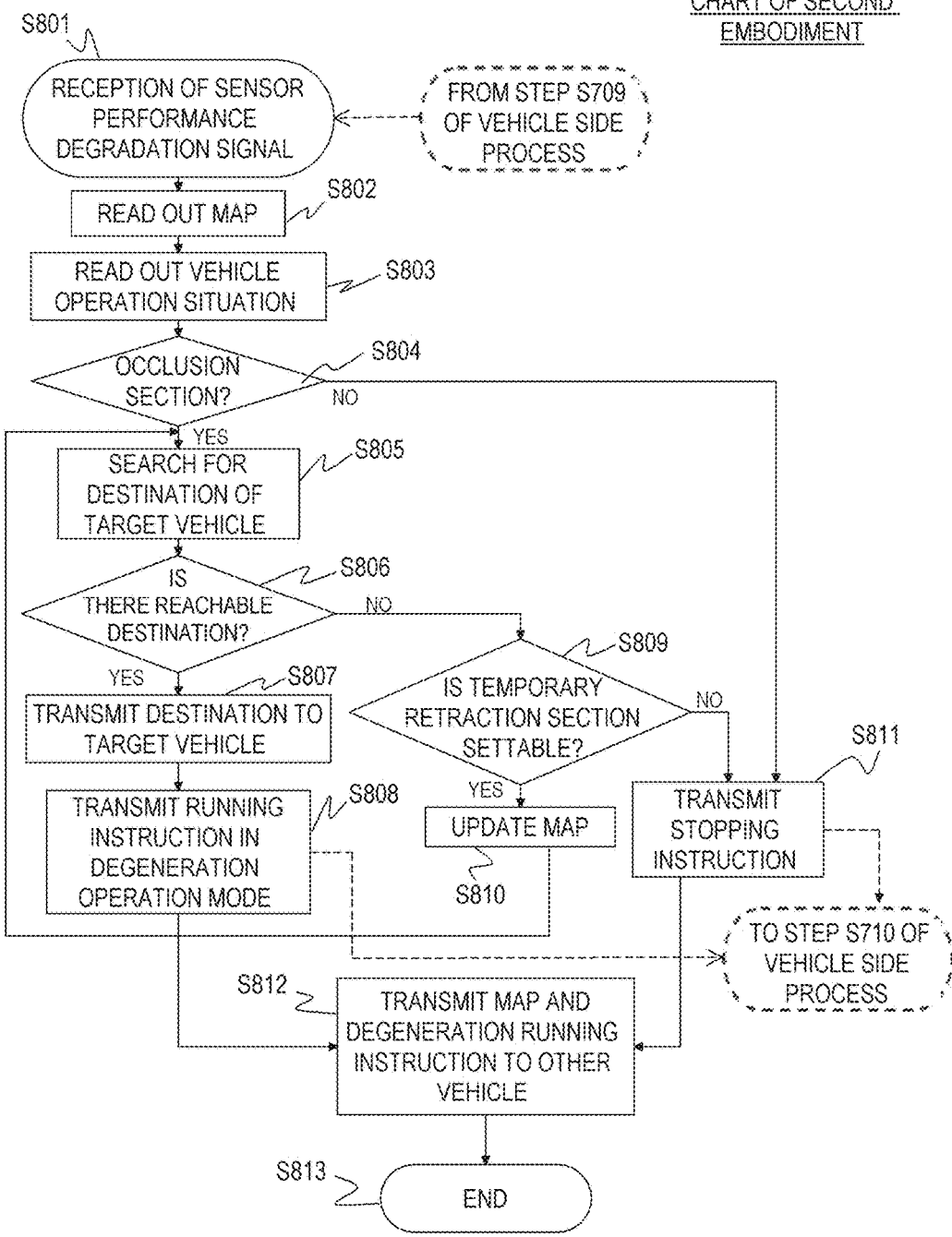
FIG. 8 is a center side flow chart of the second embodiment.

FIG. 8 is a flow chart illustrating a flow of processing on the center side of the second embodiment. Since processing on the center side must be executed only when performance degradation of a sensor is detected on the vehicle side, the processing is activated when a sensor performance degradation signal is received at step S801. At next step S802, the map information is read out, and at step S803, a vehicle movement situation of the vehicle is read out. Then at next step S804, it is decided whether or not the position at present of the vehicle is within an occlusion section. If the position at present of the vehicle is within an occlusion section, then the processing advances to step S805, at which a search for a retreat place which can be reached by the vehicle is performed.

Such a search as just described may be performed such that the process is repeated until a branch of the search is extended from a section of the position at present of the vehicle using the Dijkstra's algorithm or the like and the extended branch comes to a non-occlusion section.

If a reachable retreat place is found at step S806, then the destination information of the retreat destination is transmitted to the vehicle at step S807. Thereafter, at step S808, a driving instruction in the degeneration operation mode is transmitted, whereafter the processing advances to step S812. Although the step S812 is not essentially required in order to achieve the effects of the present invention, by transmitting, when the vehicle drives or stops by degeneration operation, a changeover instruction to degeneration operation to the other driving vehicles to set speed limitation to all vehicles, the safety upon sensor performance degradation can be enhanced further. The limit value to the speed at this time has no relationship to the state of the sensors and may be set to 0.5 times the section speed limit without exception.

If a reachable retreat place is not found at step S806, then the processing advances to step S809, at which the shape and so forth of the transport path are searched to newly search for a place which can be set as a reachable section. If a new retreat section is set successfully at step S809, then the map information is updated, and then the processing returns to step S805 to perform a search for a destination which can be reached by the vehicle.

On the other hand, if the position at present is outside an occlusion section at step S804 or if a temporary retreat section cannot be set at step S809, then since it is necessary for the vehicle to stop at the location at present, the processing advances to step S811, at which a stopping instruction is transmitted to the vehicle. Thereafter, the processing advances to step S813, at which the processing is ended.

Figures 9, 10:
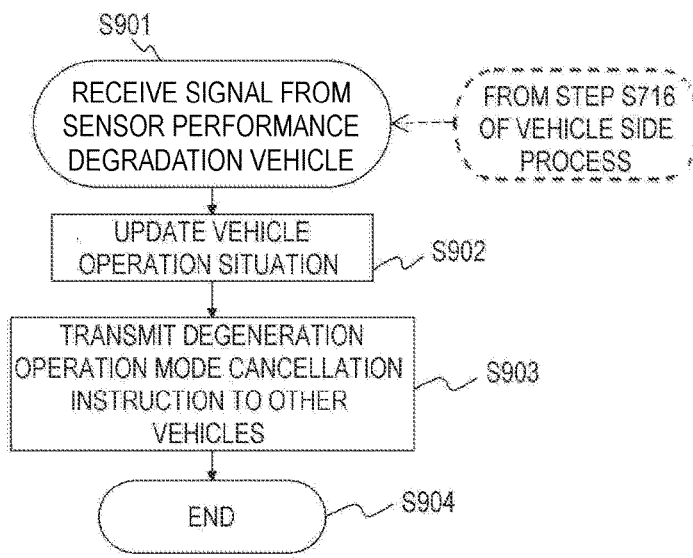
FIG. 9 is a center side flow chart for degeneration operation cancellation.
FIG. 10 is a performance degradation evaluation value calculation method of a sensor.

FIG. 9 is a flow chart illustrating a flow of a degeneration operation cancellation process on the center side in the second embodiment.

The present processing is started at step S901 at which a sensor stopping completion notification transmitted at step S716 depicted in FIG. 7 is received by the control center side, and at next step S902, the vehicle operation situation is updated. Then, after a state in which a safe stopping state of the vehicle is confirmed is entered, a degeneration operation mode cancellation instruction is transmitted to the other vehicles at step S903. Then, the processing is ended at step S904.

A performance degradation evaluation value calculation method for a sensor in the second embodiment is illustrated in FIG. 10. In the figure, a case is illustrated in which a performance degradation evaluation value of a stereo camera as an example of a sensor is determined. Upon evaluation value calculation, a valid area 1001 which can be utilized for detection is divided into five in each of the vertical and horizontal directions as depicted in FIG. 10, namely, into totaling twenty-five regions to perform evaluation. It is to be noted that, for description, to the individual divisional regions, region names are allocated from E11 for the right upper region to E55 for the left lower region.

To each region, a weight value of 10 to 80 is provided as depicted in FIG. 10. In the present embodiment, an evaluation value is calculated in accordance with an expression given below:

Evaluation value=(invalid pixel number+pixel number in divisional area)×weight value of region   expression 1

+overall dirt rate×100   expression 2

The term of expression 1 in the expression given above indicates a value obtained by multiplying the ratio of invalid pixels in each region by a weight value for the region. The invalid pixel is defined as a pixel which is invisible or whose output value does not vary due to adhesion of dirt or slow to the sensor. In the term of expression 1, by multiplying the ratio of invalid pixels by a weight value for each region, the dirt of a region in which the influence upon obstacle detection is small is evaluated low while the dirt of a region in which the influence is great is evaluated high.

For example, the region E32 in FIG. 10 is a region in which principally the driving road surface is positioned, and a vehicle or a general obstacle is positioned in the region with a high degree of possibility. Accordingly, it is considered that the degradation of the sensor performance by mud dirt 1003 adhering to this region is great, and the weight value is set so high as 80. On the other hand, in the region E11, the possibility that a distant view of the sky may be positioned is high, and the significance in obstacle detection is low. Accordingly, dirt 1002 adhering to this region may be evaluated low with respect to the ratio of the pixel number in the region, and the weight value for this region is set so low as 10.

Further, although the regions E51 to E55 are road surface regions, from the point that an obstacle of a detection target looks great at a short distance or since it is considered that an obstacle having a height extends also to the regions E41 to E45 at an upper location, the weight value is set low.

In the item (expression 2) in the expression given above, the dirt ratio of the overall screen is multiplied by a weight for calculation to perform uniform evaluation over the overall screen.

FIG. 11 illustrates a motion rule when the sensor performance degrades. In FIG. 11, as items, items of sensor type 1101, evaluation value range 1102, motion mode 1103, speed limit 1104, steering angle limit 1105, cleaning motion 1106 and center notification 1107 are described. Of the items, the sensor type 1101 indicates a name of a sensor of an evaluation target and has no relationship to a motion. In regard to the evaluation value range 1102, evaluation values of sensors determined by the sensor state evaluation means are divided into ranges, and a motion to be performed and a value are set for each range.

The items from the motion mode 1103 to the center notification 1107 indicate designations of motions, and the motion mode 1103 from among them indicates a type of a motion. From among motions indicated in the motion mode 1103, "normal operation" signifies continuation of driving in an ordinary state, and "cleaning" signifies that a clearing motion is performed. Except that a cleaning motion is performed, the operation is similar to the normal operation. Further, "degeneration operation" signifies that a limit value to the speed or the steering angle is set and driving is continued within the range of the limit value.

To the speed limit 1104, a value of the limit speed in degeneration operation is described. If speed limitation is not to be performed, then "no" is stored, but if speed limitation is to be performed and the vehicle is to drive by degeneration operation, then the magnification of the speed limit value is stored. In this case, the speed limit value is calculated by speed limit value in driving section×magnification, and for example, when degeneration operation by ×0.6 is to be performed in a limit speed section of 50 km/h, the speed limit value is 50×0.6=30 km/h. Further, in the steering angle limit 1105, a steerable maximum angle is indicated, and when the value of the steering limit is 20 degrees, this signifies that, upon degeneration operation, the steering angle is limited to the angle of 20 degrees to the left and the right.

The values of the cleaning motion 1106 and the center notification 1107 are flags, and that the flag 1 signifies that the pertaining motion is performed once. For example, in the case where the flag of the cleaning activation is 1, cleaning is carried out once. When the center notification 1107 is changeover to degeneration operation and stopping of operation, the flag is set, and that the conditions are entered is conveyed to the center.

As motion setting relating to the GPS, only when the evaluation value is equal to or lower than 10, namely, only when the motion is in a much stabilized state, the motion mode is set to "operation stopping mode crawling permission." This permits driving by crawling taking it into consideration that, although the value of the sum 1111 of the evaluation values of the external world recognition sensors is equal to or higher than 200 and the degree of the dirt or failure is terrible and the vehicle is in a driving disabled state, position detection by the GPS is being performed stably. In the present embodiment, the driving speed limit thereupon is set to 50 km/h and the limit value to the handle steering angle is set to 15 degrees irrespective of the driving section.

Figure 12:
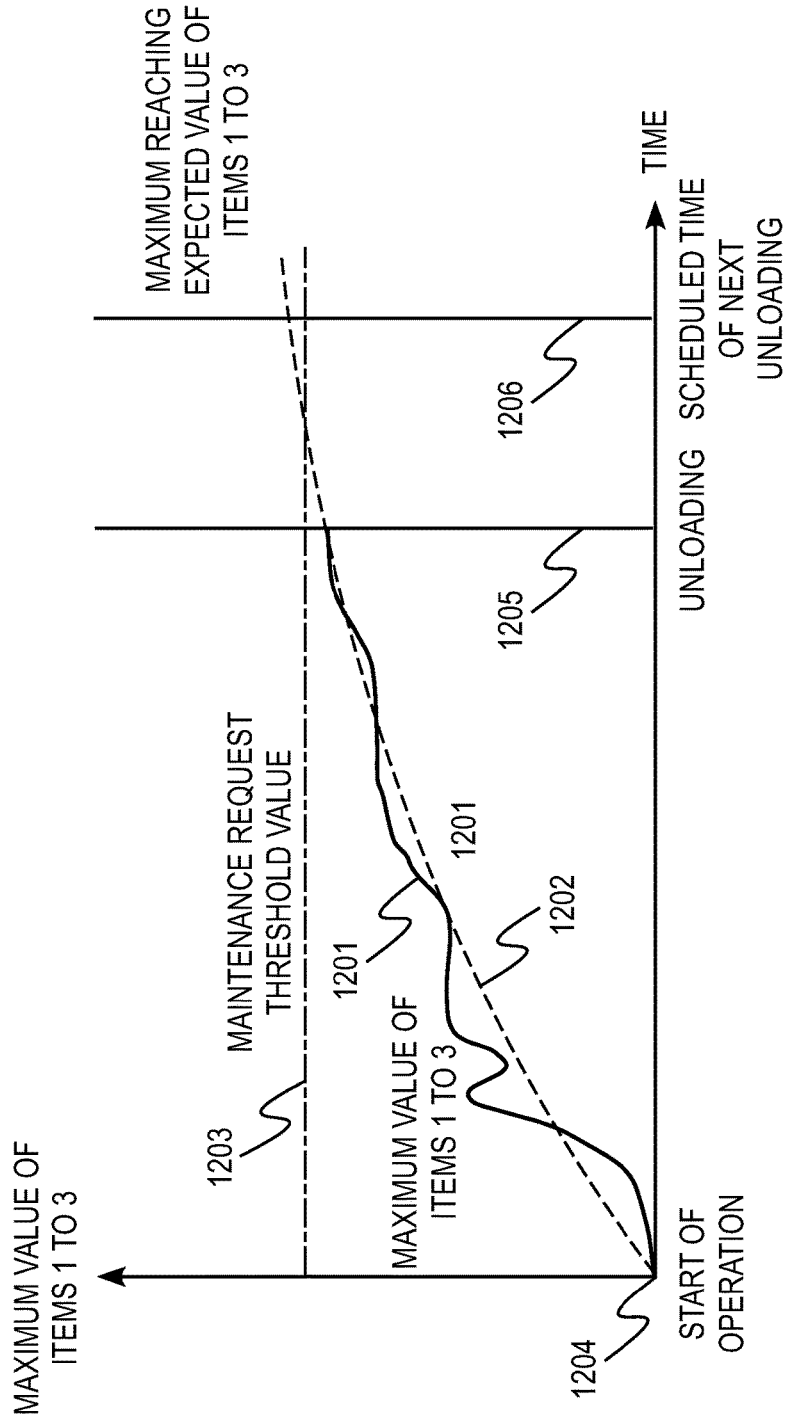
FIG. 12 is an explanatory view of a maintenance request decision by sensor performance degradation prediction.

FIG. 12 is an explanatory view of maintenance request decision by sensor performance degradation prediction. Referring to FIG. 12, a maximum value of items 1 to 3, namely, a maximum value from among evaluation values of the stereo camera, LIDAR and millimeter wave radar, is recorded after every fixed time interval, and a variation 1202 of the evaluation value after the present point of time is predicted from a variation 1201 of the maximum value using an approximate curve or the like. This motion is carried out at an appropriate timing other than any timing during driving within an occlusion section such as, for example, a timing at which the dump completes unloading or a timing at which the dump completes loading.

On the other hand, the time interval from unloading to unloading 1205 is stored, or a period of time until the vehicle comes to a next destination on the basis of route information from the control center is estimated and the value of a maximum value at the next timing 1206 from the variation of the prediction value and the estimated timing of the next timing 1206.

In this manner, an evaluation value at a next delimitation time point is predicted at a delimitation time point of a work, and if the value exceeds a maintenance request threshold value 1203, then a maintenance request is transmitted to the control center in accordance with the rule depicted in an item 1112 of FIG. 11. When the control center side receives the maintenance request, it changes the destination of the vehicle to a point at which maintenance can be performed and allows the vehicle to drive to the point.

By implementing such a mechanism as described above, when a sensor suffers from performance degradation by dirt or the like, it can be checked just before that the vehicle is placed into stopping of operation or enters driving by degeneration operation, and eventually, it can be achieved to improve the overall movement efficiency.

DESCRIPTION OF REFERENCE NUMERALS

101: Sensor 1
102: Sensor 2
103: Sensor 1 state evaluation means
104: Sensor 1 obstacle detection means
105: Sensor 2 state evaluation means
106: Sensor 2 obstacle detection means
107: Speed and steering angle limit value setting means
108: Speed and steering angle control value arithmetic operation means
109: Driving controlling means
110: Own vehicle position detection means
111: Movement obstacle evaluation means
112: Map information storage means
113: Driving means
401: Stereo camera
402: LIDAR
403: Millimeter wave radar
404: GPS apparatus
405: Sensor cleaning means
406: Sensor performance degradation indication means
407: Autonomous driving vehicle
515: Control center

The invention claimed is:

1. An autonomous driving vehicle which autonomously drives with an external world recognition sensor, comprising:
　a processor configured to:
　　store map information of a driving path of the vehicle therein;
　　evaluate a state of performance degradation of a sensor;
　　evaluate, from a position at present of the vehicle and the map information, an influence on movement of other vehicles when the vehicle stops at the position; and
　　set a limit value to a speed when the vehicle drives in response to a result of the evaluation of the processor; and wherein,
　　operation of the autonomous driving vehicle is divided into different modes including at least a degeneration mode during which an actual speed of the autonomous driving vehicle is multiplied by 0.3 to obtain a reduced speed at which the autonomous driving vehicle is operated and during which a steering angel is limited to 30 degrees.

2. The autonomous driving vehicle according to claim 1, wherein
　the process is also configured to perform control of a steering angle; and,
　when the result of the evaluation of the processor is within the first range, if the result of the evaluation of the processor is without the second range, a steering angle limit value is set based on the result of the evaluation of the processor and then driving is continued within a range of the limit value.

3. The autonomous driving vehicle according to claim 1, wherein,
　when the result of the processor is within the second range, the vehicle is stopped.

4. The autonomous driving vehicle according to claim 1, wherein
　a detection area of the sensor is divided into a plurality of divisional areas and a weight is set individually to the areas and an evaluation value based on dirt of the sensor or a degree of failure is calculated for each of the areas, and the result of the evaluation by the processor is obtained using a value obtained by adding a value obtained by weighting corresponding to the area to the evaluation value.

5. The autonomous driving vehicle according to claim 2, wherein,
　when the result of the evaluation of the processor satisfies a predetermined condition, the vehicle moves to a destination which is outside an occlusion section using a value of a set limit value of the steering angle.

6. The autonomous driving vehicle according to claim 1, wherein,
　when the result of the evaluation in a state in which the result satisfies a predetermined condition, a notification of the state is issued to an external control center, and route information to a destination transmitted from the control center is received.

\* \* \* \* \*